United States Patent [19]

Chow

[11] Patent Number: 5,646,647
[45] Date of Patent: Jul. 8, 1997

[54] AUTOMATIC PARKING OF CURSOR IN A GRAPHICAL ENVIRONMENT

[75] Inventor: Chunghen Chow, Austin, Tex.

[73] Assignee: International Business Machines Corporation, Armonk, N.Y.

[21] Appl. No.: 337,711

[22] Filed: Nov. 14, 1994

[51] Int. Cl.⁶ .................................................. G06F 3/033
[52] U.S. Cl. ........................................ 345/145; 395/339
[58] Field of Search ..................................... 345/145, 116, 345/157, 160, 163; 395/339

[56] References Cited

U.S. PATENT DOCUMENTS

| | | | |
|---|---|---|---|
| 3,618,032 | 11/1971 | Goldsberry et al. | 345/141 |
| 4,733,351 | 3/1988 | Peirent . | |
| 4,760,386 | 7/1988 | Heath et al. . | |
| 5,133,011 | 7/1992 | McKiel, Jr. . | |
| 5,146,556 | 9/1992 | Hullot et al. . | |
| 5,189,403 | 2/1993 | Franz et al. . | |
| 5,252,952 | 10/1993 | Frank et al. . | |
| 5,363,481 | 11/1994 | Tilt | 395/326 X |
| 5,367,631 | 11/1994 | Levy | 345/163 |
| 5,461,318 | 10/1995 | Borchert et al. | 324/533 |

FOREIGN PATENT DOCUMENTS

| 6-167956 | 6/1994 | Japan | 345/145 |
|---|---|---|---|

OTHER PUBLICATIONS

Townsend et al., "Microsoft Office 6-in-1," 1994, p. 104.
*IBM Technical Disclosure Bulletin,* "Pointer-Finding Message Boxes," vol. 36, No. 08, Aug. 1993, p. 307.
*IBM Technical Disclosure Bulletin,* "Automated Mouse Pointer Movement Function," vol. 36, No. 04, Apr. 1993, pp. 433-435.
*IBM Technical Disclosure Bulletin,* "Method for Simplifying the Accurate Positioning of a Mouse Pointer," vol. 36, No. 04, Apr. 1993, pp. 339-341.
*IBM Technical Disclosure Bulletin,* "Method of Incorporating Automatic Mouse Pointer Positioning into Existing Applications," vol. 37, No. 04A, Apr. 1994, p. 347.
Inspec. Abstract, "Icon Display and Signalling Method," RD-333101-A.

*Primary Examiner*—Mark R. Powell
*Attorney, Agent, or Firm*—Jeffrey S. LaBaw; Jenkens & Gilchrist; Raymond M. Galasso

[57] ABSTRACT

A system and method whereby the cursor displayed by a data processing system on a monitor is automatically moved to a preselected location on the desktop, called the parking area, whenever it has been inactive for a predetermined amount of time. If the window focus is dependent on the location of the cursor, the parking area can be located within a specified window.

12 Claims, 3 Drawing Sheets

AUTOMATIC PARKING OF CURSOR IN A GRAPHICAL ENVIRONMENT

TECHNICAL FIELD OF THE INVENTION

The present invention relates to a data processing system and method and more particularly to a data processing system having a cursor controlled by a pointing device.

BACKGROUND OF INVENTION

Most contemporary computer operating systems have a graphical user interface ("GUI"). A GUI represents computer elements as a number of overlapping windows and icons displayed over a background ("the desktop"). Users of the operating systems perform actions on the desktop by using a mouse or other pointing device to move a cursor over a desired region and then clicking a button.

As computers and operating systems grow more powerful, so has the size and resolution of the computer screen on which the desktop is displayed. A larger screen allows a greater amount of information to be simultaneously displayed to the user. However, an unintended side effect of the larger screen is that it becomes difficult for the user to quickly locate the cursor. This difficulty is especially true after the user looks away from the screen or focuses attention on another part of the desktop, such as the text field of a word processing program.

There have been several prior art attempts to make the cursor easier to locate. For example, one solution was to make the cursor larger. This solution, however, made it more difficult for the user to precisely position the cursor. L. M. Cahill et al., IBM Technical Disclosure Bulletin, Vol. 36, No. 08, Aug. 1993, p. 307, disclosed a solution which automatically moved the cursor to a certain region whenever user input was required. This solution, however, was only effective if the computer program prompted for user input; the user still had to locate the cursor in order to perform other operations.

Thus, there is a need in the art for a system which lets a computer user quickly locate the cursor which does not have the above limitations.

SUMMARY OF THE INVENTION

Accordingly, it is an object of the present invention to provide a GUI that allows a user to quickly locate the cursor without necessarily enlarging the size of the cursor.

It is another object of the present invention to provide a GUI that allows a user to quickly locate the cursor when the user seeks to perform an action other than respond to a computer program prompt.

It is another object of the invention to provide a GUI that allows a user to quickly locate the cursor in computer systems in which the window focus is dependent upon the cursor location.

These and other objects of the invention are accomplished by providing for a system and method whereby the cursor is automatically moved to a preselected location on the desktop, called the parking area, whenever it has been inactive for a predetermined amount of time. If the window focus is dependent upon the location of the cursor, the parking area can be located within a specified window.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following description taken in conjunction with the accompanying drawing, in which.

DETAILED DESCRIPTION OF THE PREFERRED EMBODIMENT OF THE PRESENT INVENTION

Figure 1:
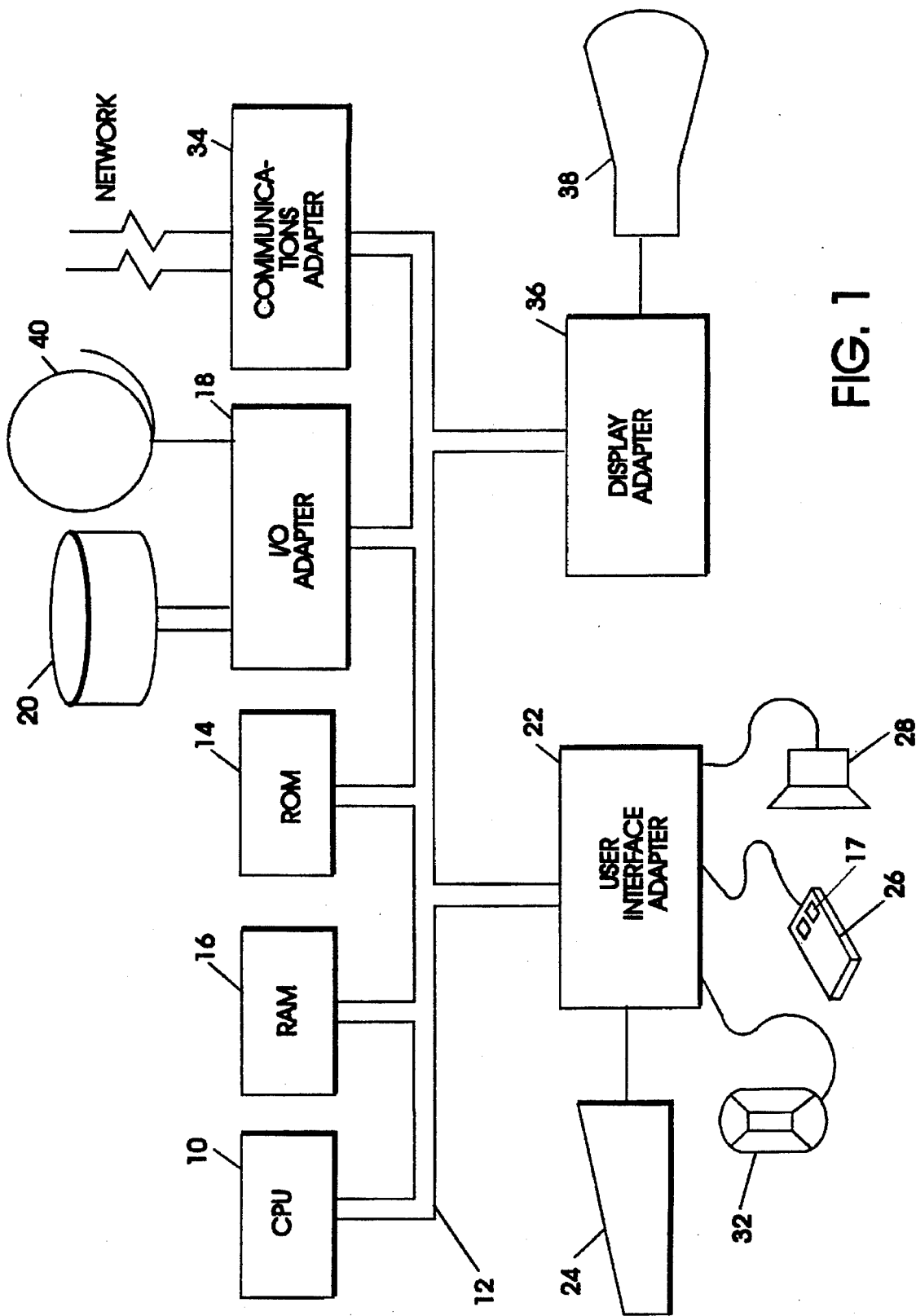
FIG. 1 shows a computer system operable to embody the present invention.

A representative hardware environment for practicing the present invention is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices to bus 12, communication adapter 34 for connecting the workstation to a data processing network, and display adapter 36 for connecting bus 12 to display device 38. The mouse 26 has button 17 and is used to control a cursor shown on monitor 38.

Figure 2:
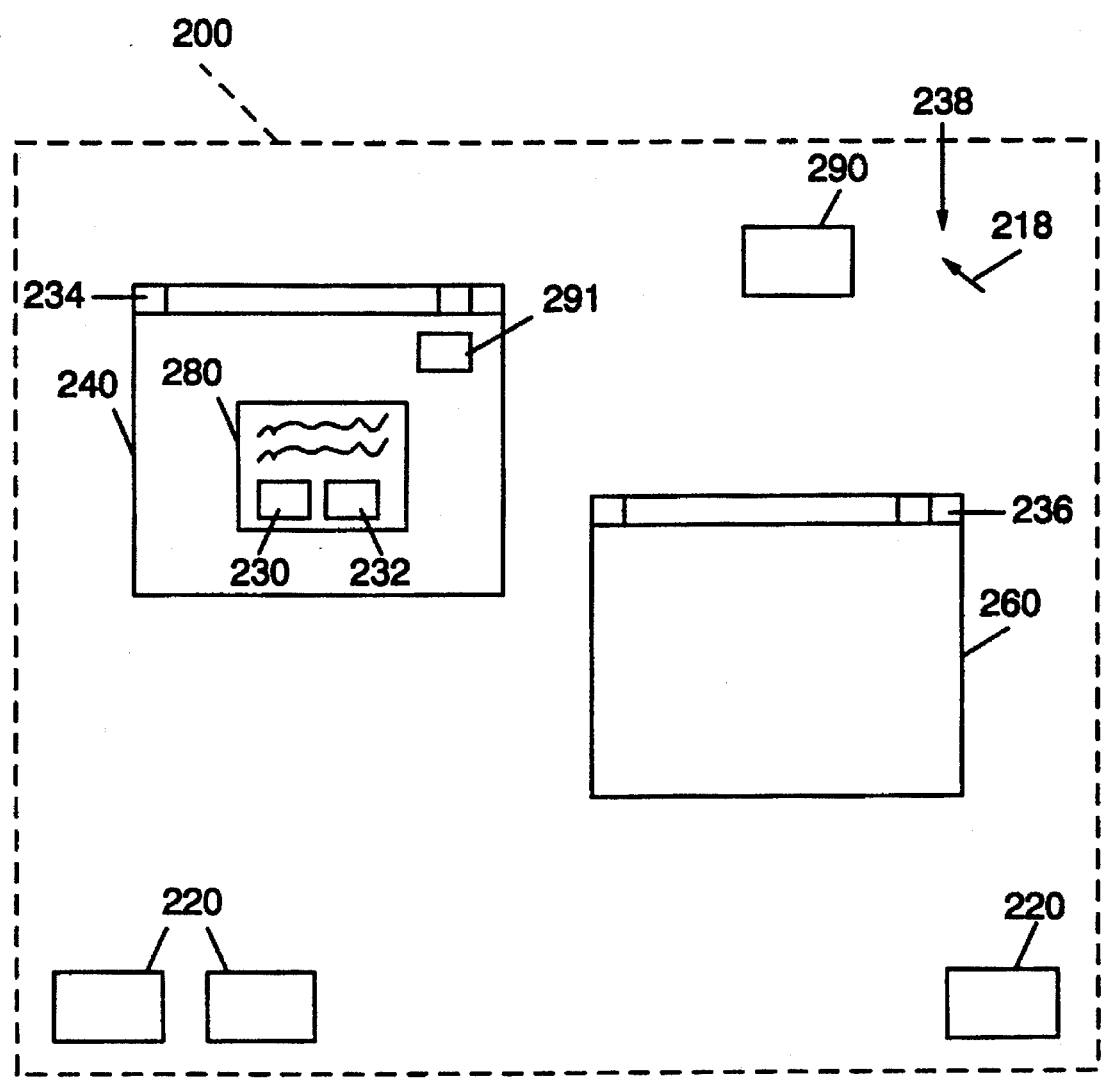
FIG. 2 shows the desktop of a computer operating system having a graphical user interface.

Referring next to FIG. 2, there is illustrated a detailed view of an operating system's graphical user interface ("GUI") as displayed on the monitor 38 in accordance with the present invention. The operating system shown in FIG. 2 is IBM's OS/2®, but the present invention will work with any GUI. This GUI includes a cursor 218, desktop 200, three icons 220, two windows 240, 260 and dialog box 280, all of which are well known in the art. Dialog box 280 contains two buttons 230, 232.

As mentioned above, movement of cursor 218 is controlled by mouse 26 or other pointing device, such as a trackball (not shown). When a user moves mouse 26 and/or presses mouse button 17, CPU 10 sends a message to the operating system saying that a mouse event has occurred. The operating system then processes the message by moving cursor 218 and putting the message in an event queue where it can be examined by interested programs.

Programs are represented by the GUI as either icons 220 or windows 240, 260. The horizontal region along the top of a window is called the "title bar" 234, 236. A program window 240, 260 has the "focus" when it has been designated by the user or operating system to receive input from keyboard 24 or mouse 26. In OS/2®, the user gives a window the focus by clicking mouse button 17 when cursor 218 is inside that window. Some operating systems, however, give a window the focus merely whenever cursor 218 is present within that window. The operating system indicates which program has the focus by changing the color of the focused window's title bar 234, 236.

The present invention scans the event queue to monitor mouse events. If a mouse event has not occurred within a predetermined time interval, the present invention moves cursor 218 to a predetermined location on desktop 200, called the parking area. In OS/2®, cursor 218 location normally does not effect window focus. Thus, predetermined location 290 need not be within a program window 24, 26. However, when the present invention is used with an operating system wherein the window focus is determined by cursor 218 location, the predetermined parking area can be made relative to the borders of the focused window (parking area 291).

The present invention can be implemented either as a part of the operating system or as a separate program. The user can set the parking location by setting a default location or selecting a location when the operating system or program is first executed. Likewise, the user can select the time period of inactivity after which the present invention will park cursor 218.

Figure 3:
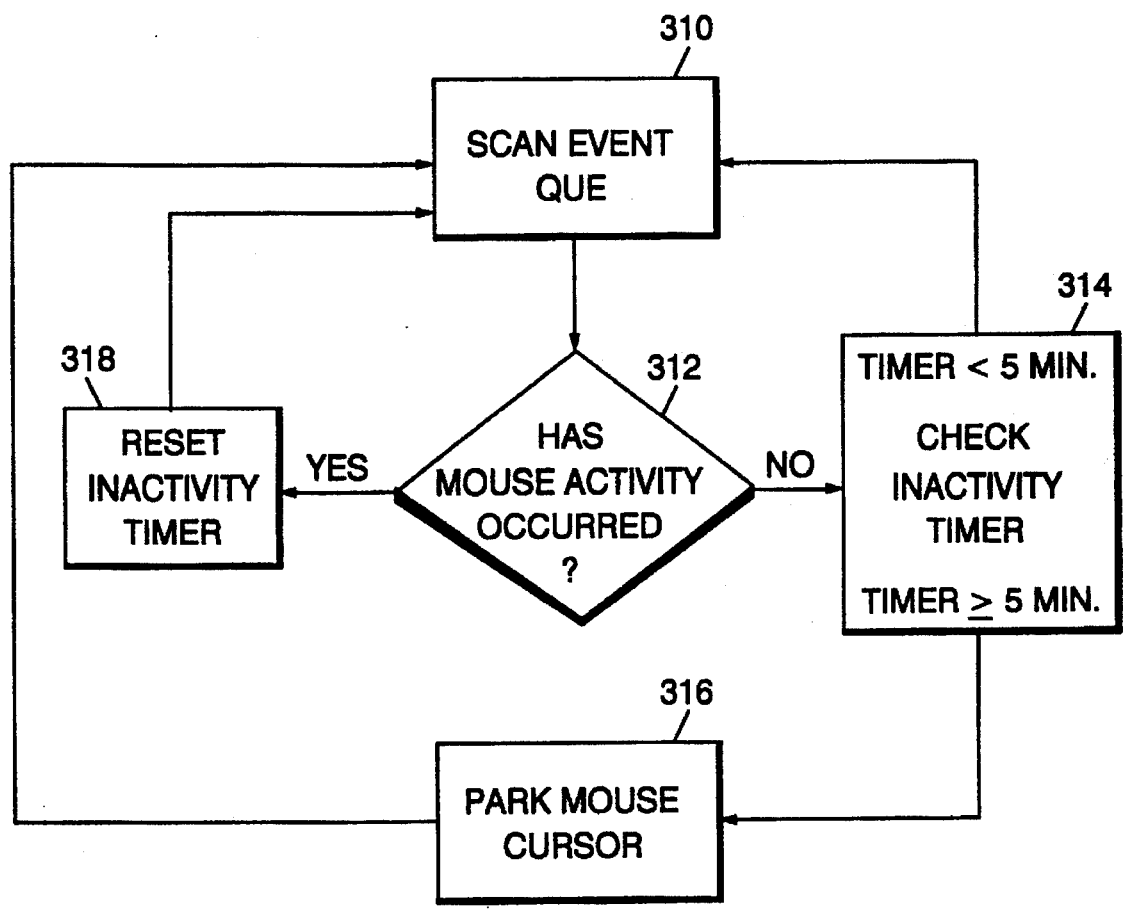
FIG. 3 is a flow diagram showing an operation of the present invention.

FIG. 3 is a flowchart showing the operation of the present invention. For the purpose of this example, assume that the user has established a predetermined cursor parking position 290 (see FIG. 2) and set the parking time interval to five minutes. Step 310 is the initial state of the invention. At step 310, the present invention scans the event queue looking for mouse 26 activity. Step 312 shows how the present invention reacts to the contents of the event queue. If no mouse 26 activity is found, the present invention moves to step 314. At step 314, the present invention checks a timer which has been timing mouse 26 inactivity. If the timer is greater than or equal to 5 minutes (the predetermined parking period), the present invention parks cursor 218 in parking location 290, as shown by step 316. After parking cursor 218, the present invention continues to scan the event queue, as shown in step 310. If the timer is less than 5 minutes at step 314, the present invention continues to scan the event queue (step 310).

If, at step 312, mouse 26 activity is detected in the event queue, the present invention resets the inactivity timer. This step is shown in the flowchart at 318. Next, the present invention returns to step 310 and again scans the event queue.

The steps illustrated in FIG. 3 may be implemented in hardware or software (e.g., stored in ROM 16, RAM 14, disk 20, tape 40) and implemented in CPU 10 (possibly in conjunction with display adapter 36 and/or user interface adapter 22).

While the invention has been shown and described with reference to the particular embodiments thereof, it will be understood by those skilled in the art that the foregoing and other changes in form and details may be made therein without departing from the spirit and scope of the invention.

What is claimed is:

1. A data processing system for displaying data on a display device and for locating a cursor displayed on a monitor of said data processing system, said system comprising:

a central processing unit coupled via a bus to one or more storage media;

a monitor coupled to a display adapter for displaying information related to an application and said cursor, said display adapter coupled to said central processing unit via said bus;

a pointing device for controlling said cursor, said pointing device coupled to said central processing unit via a user interface adapter and said bus;

detecting means for detecting an attribute of said pointing device; and parking means for parking said cursor at a predetermined location on said monitor when said detecting means detects that said attribute of said pointing device has achieved a predetermined value.

2. The system of claim 1, wherein said pointing device is a mouse.

3. The system of claim 1, further comprising timing means for measuring a time period of pointing device inactivity.

4. The system of claim 3, wherein said parking means parks said cursor at said predetermined location when said time period of pointing device inactivity measured by said timing means exceeds a predetermined time limit.

5. The system of claim 1, further comprising at least one program window displayed on said monitor, said at least one program window having a border and one of said at least one program window having a focus.

6. The system of claim 5, wherein said predetermined location for parking said cursor is positionally related to said border of said at least one window having said focus.

7. The system of claim 1, further comprising a keyboard for inputting information to said central processing unit.

8. The system as recited in claim 1, wherein said attribute of said pointing device is activity of said pointing device, and wherein said predetermined value is inactivity of said pointing device.

9. In a computer system having a central processing unit coupled to a display device displaying a cursor and a pointing device for controlling said cursor, a method for parking said cursor comprising the steps of:

measuring a time period of pointing device inactivity; and parking said cursor in a predetermined location when said time period of pointing device inactivity exceeds a predetermined time limit.

10. The method of claim 9, wherein said predetermined location is positionally related to a border of a program window.

11. The method of claim 9, wherein said pointing device for controlling said cursor is a mouse.

12. A system for parking a mouse pointer in a predetermined location on a display screen coupled to a data processing system, said system comprising:

means for measuring a time period of mouse inactivity; and means for parking said mouse pointer in said predetermined location when said time period of mouse inactivity exceeds a predetermined time limit.

\* \* \* \* \*